(12) United States Patent
Vishal

(10) Patent No.: US 12,600,600 B2
(45) Date of Patent: Apr. 14, 2026

(54) SEAL ASSEMBLY FOR AN ELEVATOR AND A METHOD TO OPERATE THE SAME

(71) Applicant: Ruphavathy Vishal, Chennai (IN)

(72) Inventor: Ruphavathy Vishal, Chennai (IN)

(73) Assignee: Ruphavathy Vishal (IN)

( * ) Notice: Subject to any disclaimer, the term of this patent is extended or adjusted under 35 U.S.C. 154(b) by 0 days.

(21) Appl. No.: 18/292,041

(22) PCT Filed: Nov. 17, 2023

(86) PCT No.: PCT/IB2023/061636
§ 371 (c)(1),
(2) Date: Jan. 25, 2024

(87) PCT Pub. No.: WO2024/141817
PCT Pub. Date: Jul. 4, 2024

(65) Prior Publication Data
US 2025/0313433 A1 Oct. 9, 2025

(30) Foreign Application Priority Data
Dec. 30, 2022 (IN) .............................. 202241077149

(51) Int. Cl.
*B66B 11/02* (2006.01)
*B66B 9/04* (2006.01)
*F16J 15/3284* (2016.01)

(52) U.S. Cl.
CPC ............ *B66B 11/0226* (2013.01); *B66B 9/04* (2013.01); *F16J 15/3284* (2013.01)

(58) Field of Classification Search
CPC .............................. B66B 11/0226; B66B 9/04
See application file for complete search history.

(56) References Cited

U.S. PATENT DOCUMENTS 2,927,661 A * 3/1960 Kristek ..................... B66B 9/04
187/360
3,066,761 A * 12/1962 Behrens .................... B66B 5/18
187/400
(Continued)

FOREIGN PATENT DOCUMENTS

AU 2020289772 A1 * 1/2022 .............. B66B 9/04
CA 104787645 A 7/2015
(Continued)

*Primary Examiner* — Michael A Riegelman
(74) *Attorney, Agent, or Firm* — Jason C. Cameron

(57) ABSTRACT
A seal assembly (100) for an elevator (200) is disclosed. The seal assembly includes a covering structure (102). The covering structure covers a top portion of the elevator. The covering structure (102) comprises a plurality of pairs of U-shaped slots (102A) integrally formed along a peripheral portion of the covering structure (102), the plurality of pairs of U-shaped slots (102A) being arranged in mutually orthogonal orientations. Further, a plurality of U-shaped plates (104) are disposed along the peripheral portion and a plurality of seal moulds (106), each seal mould (106) is positioned in a respective region bounded by the peripheral portion and a lower surface of the covering structure (102), the pair of outer side walls (104A, 104B), and an elevator cabin (220) of the pneumatic vacuum elevator (200), thereby enhancing sealing performance and reducing vibration transmission to the elevator cabin.

8 Claims, 6 Drawing Sheets

(56)        References Cited

U.S. PATENT DOCUMENTS

| | | | | |
|---|---|---|---|---|
| 3,949,953 | A * | 4/1976 | Hopkins | B65G 51/06 |
| | | | | 406/185 |
| 5,181,807 | A * | 1/1993 | Anders | B65G 51/06 |
| | | | | 406/190 |
| 5,447,211 | A * | 9/1995 | Sors | B66B 9/04 |
| | | | | 187/277 |
| 5,512,791 | A * | 4/1996 | Cho | H02K 41/02 |
| | | | | 187/250 |
| 5,583,326 | A * | 12/1996 | Sors | B66B 9/04 |
| | | | | 187/277 |
| 6,085,873 | A * | 7/2000 | Macchi | B65G 51/04 |
| | | | | 187/400 |
| 10,233,055 | B1 * | 3/2019 | Ascua | B66B 11/026 |
| 10,351,388 | B2 * | 7/2019 | Ascua | B66B 9/04 |
| 11,780,707 | B1 * | 10/2023 | De Ledebur | B66B 7/047 |
| | | | | 187/408 |
| 11,814,267 | B2 * | 11/2023 | Babu | B66B 11/0226 |
| 11,834,297 | B1 * | 12/2023 | De Ledebur | F16J 15/3284 |
| 12,054,356 | B2 * | 8/2024 | Vishal | B66B 11/0226 |
| 2023/0136840 | A1 * | 5/2023 | Babu | B66B 11/004 |
| | | | | 187/250 |
| 2023/0192444 | A1 * | 6/2023 | Babu | B66B 9/04 |
| 2024/0228233 | A1 * | 7/2024 | Vishal | B66B 9/04 |

FOREIGN PATENT DOCUMENTS

| | | | | | |
|---|---|---|---|---|---|
| EP | | 3498651 | A2 | 6/2019 | |
| WO | | 2021245536 | A1 | 12/2021 | |
| WO | WO-2022013606 | A1 * | 1/2022 | | B66B 1/28 |
| WO | WO-2022175730 | A1 * | 8/2022 | | B66B 9/04 |
| WO | WO-2025114767 | A1 * | 6/2025 | | B66B 11/0423 |

* cited by examiner

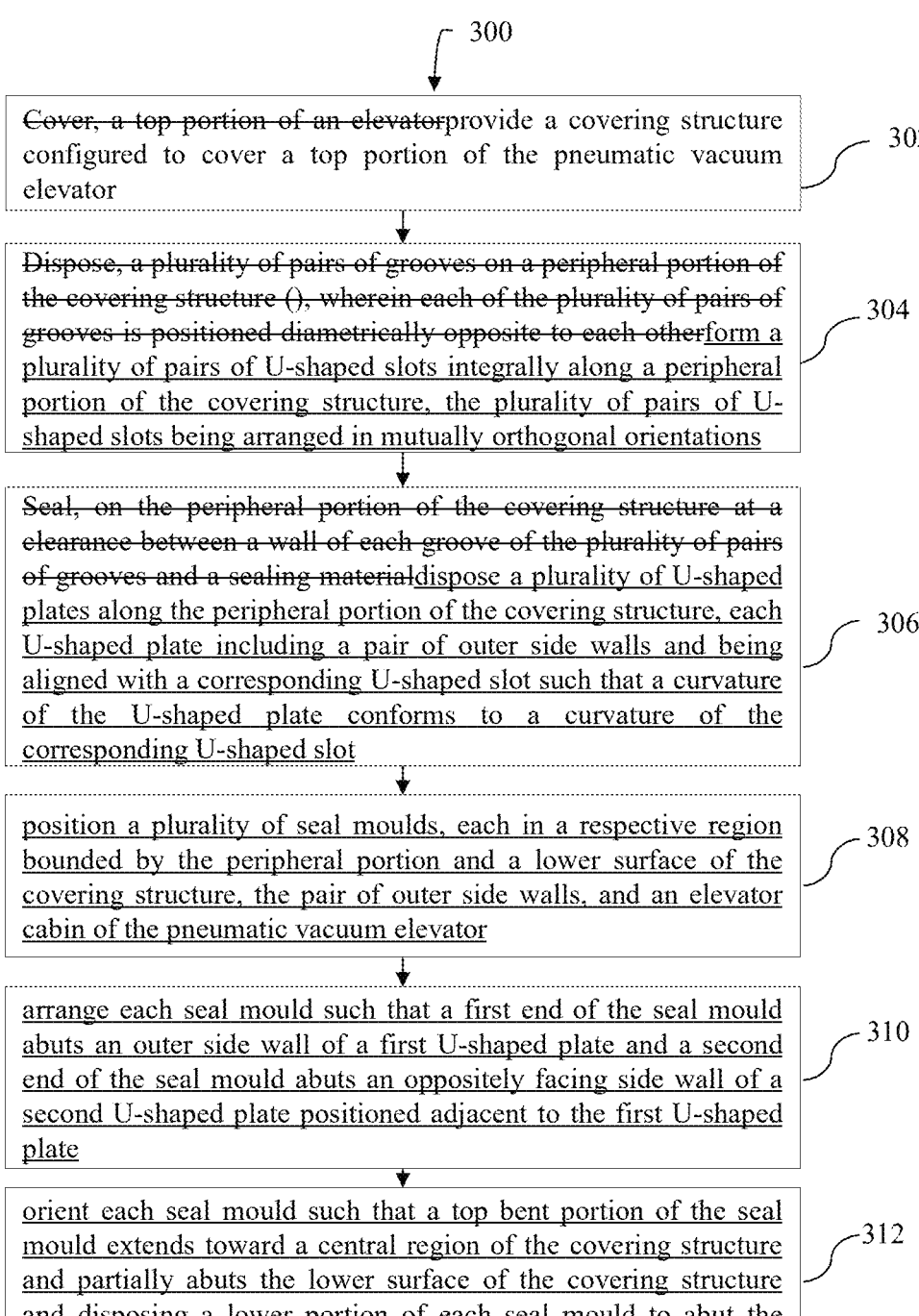

300

~~Cover, a top portion of an elevator~~provide a covering structure configured to cover a top portion of the pneumatic vacuum elevator ⟶ 302

~~Dispose, a plurality of pairs of grooves on a peripheral portion of the covering structure (), wherein each of the plurality of pairs of grooves is positioned diametrically opposite to each other~~form a plurality of pairs of U-shaped slots integrally along a peripheral portion of the covering structure, the plurality of pairs of U-shaped slots being arranged in mutually orthogonal orientations ⟶ 304

~~Seal, on the peripheral portion of the covering structure at a clearance between a wall of each groove of the plurality of pairs of grooves and a sealing material~~dispose a plurality of U-shaped plates along the peripheral portion of the covering structure, each U-shaped plate including a pair of outer side walls and being aligned with a corresponding U-shaped slot such that a curvature of the U-shaped plate conforms to a curvature of the corresponding U-shaped slot ⟶ 306 position a plurality of seal moulds, each in a respective region bounded by the peripheral portion and a lower surface of the covering structure, the pair of outer side walls, and an elevator cabin of the pneumatic vacuum elevator ⟶ 308 arrange each seal mould such that a first end of the seal mould abuts an outer side wall of a first U-shaped plate and a second end of the seal mould abuts an oppositely facing side wall of a second U-shaped plate positioned adjacent to the first U-shaped plate ⟶ 310 orient each seal mould such that a top bent portion of the seal mould extends toward a central region of the covering structure and partially abuts the lower surface of the covering structure and disposing a lower portion of each seal mould to abut the elevator cabin ⟶ 312

FIG. 6                                    Signature

SEAL ASSEMBLY FOR AN ELEVATOR AND A METHOD TO OPERATE THE SAME

FIELD OF INVENTION

Embodiments of the present disclosure relate to elevators and more particularly to a seal assembly for elevators and a method to assemble the same.

BACKGROUND

An elevator moves in a vertical shaft to carry passengers or freight between the levels of a multi-storey building. The pneumatic vacuum elevator uses air pressure to cause motion of the passenger cabin within a thoroughfare or tubular cylinder. The mechanism uses the air within the tubular cylinder as a working fluid. Brakes, motors, valves, electronic controls and other equipment work in tandem to ensure a safe and pleasant riding experience for each occupant therein. In addition, the unnecessary braking of elevator and speed-raising also increases the extra mechanical wear of elevator, thereby have reduced the service life of elevator. Various components of the elevator include a cabin, a controller, a sealing unit, and the like A seal assembly is an important equipment attached on top of a pneumatic vacuum elevator. The seal assembly enables a frictionless movement and an easy elevation of the cabin due to the pneumatic depression generated on the upper part of the tubular cylinder. In operation, the elevator cabin undergoes a rough transition as the cabin moves from one location to another. Associated movement experience vibration as the elevator cabin transports.

Although, the currently known sealing units or assemblies reduces vibrations during the movement of the cabin while sealing the cabin in elevator cylinder. There is need of a sealing unit the is efficient in reducing vibrations of the elevator cabin. There is need of a sealing unit that is simple and mounted easily in the elevators. There is need of a sealing unit that provides tight sealing to the elevator.

Hence, there is a need for a seal assembly for elevators and a method to assemble the same to address the aforementioned issue(s).

BRIEF DESCRIPTION

In accordance with an embodiment of the present disclosure, a seal assembly for a pneumatic vacuum elevator is provided. The seal assembly includes a covering structure. The covering structure is configured to cover a top portion of the pneumatic vacuum elevator. The covering structure includes a plurality of pairs of U-shaped slots integrally formed along a peripheral portion of the covering structure, the plurality of pairs of U-shaped slots being arranged in mutually orthogonal orientations. A plurality of U-shaped plates are disposed along the peripheral portion of the covering structure. Each U-shaped plate including a pair of outer side walls and being aligned with a corresponding U-shaped slot such that a curvature of the U-shaped plate conforms to a curvature of the corresponding U-shaped slot. The plurality of U-shaped plates is adapted to receive at least one guide rail of the pneumatic elevator cabin (220) thereby enabling upward and downward movement of the cylindrical elevator cabin via the guiding rails in predefined path. The seal assembly further comprises a plurality of seal moulds, each positioned in a respective region bounded by the peripheral portion and a lower surface of the covering structure, the pair of outer side walls, and an elevator cabin of the pneumatic vacuum elevator, the each seal mould having a first end abutting an outer side wall of a first U-shaped plate and a second end abutting an oppositely facing side wall of a second U-shaped plate positioned adjacent to the first U-shaped plate, the each seal mould further having a top bent portion extending toward a central region of the covering structure and partially abutting the lower surface of the covering structure, and a lower portion extending from the top bent portion to abut the elevator cabin, the top bent portion and the lower portion of the each seal mould forming respective sealing interfaces with the lower surface of the covering structure and with the elevator cabin, thereby enhancing sealing performance and reducing vibration transmission to the pneumatic vacuum elevator.

In accordance with another embodiment of the present disclosure, a method for assembling a seal assembly for a pneumatic vacuum elevator, the method comprising providing a covering structure configured to cover a top portion of the pneumatic vacuum elevator, forming a plurality of pairs of U-shaped slots integrally along a peripheral portion of the covering structure, the plurality of pairs of U-shaped slots being arranged in mutually orthogonal orientations, disposing a plurality of U-shaped plates along the peripheral portion of the covering structure, each U-shaped plate including a pair of outer side walls and being aligned with a corresponding U-shaped slot such that a curvature of the U-shaped plate conforms to a curvature of the corresponding U-shaped slot, positioning a plurality of seal moulds, each in a respective region bounded by the peripheral portion and a lower surface of the covering structure, the pair of outer side walls, and an elevator cabin of the pneumatic vacuum elevator, arranging each seal mould such that a first end of the seal mould abuts an outer side wall of a first U-shaped plate and a second end of the seal mould abuts an oppositely facing side wall of a second U-shaped plate positioned adjacent to the first U-shaped plate, orienting each seal mould such that a top bent portion of the seal mould extends toward a central region of the covering structure and partially abuts the lower surface of the covering structure and disposing a lower portion of each seal mould to abut the elevator cabin, whereby the top bent portion and the lower portion of each seal mould form respective sealing interfaces with the lower surface of the covering structure and with the elevator cabin, thereby enhancing sealing performance and reducing vibration transmission to the pneumatic vacuum elevator.

In accordance with yet another embodiment of the present disclosure, a pneumatic vacuum is provided. The pneumatic vacuum elevator includes an external cylinder assembly, a guide rail pillar, a polycarbonate sheet, a seal assembly, and an electronic control unit. The external cylindrical assembly includes an elevator cabin inserted therein, wherein the external cylinder assembly further includes a plurality of cylinders coupled using a base ring assembly and a band ring assembly. The guide rail pillar is mechanically coupled to the elevator cabin. The guide rail pillar is disposed at the external cylinder assembly. The guide rail pillar is configured to guide an actuation of the elevator cabin. The polycarbonate sheet is configured to cover the external cylinder assembly. The polycarbonate sheet and the external cylinder assembly is coupled using a first locking device and a second locking device. The first locking device is configured to lock an air gap between the polycarbonate sheet, the base ring assembly, and the external cylinder assembly and the second locking device is configured to lock an air gap between the polycarbonate sheet and the guide rail pillar a seal assembly adapted to fit over a top portion of the elevator cabin. The seal assembly includes a covering structure. The covering structure is configured to cover a top portion of the pneumatic vacuum elevator. The covering structure includes a plurality of pairs of U-shaped slots integrally formed along a peripheral portion of the covering structure, the plurality of pairs of U-shaped slots being arranged in mutually orthogonal orientations. A plurality of U-shaped plates disposed along the peripheral portion of the covering structure. Each U-shaped plate including a pair of outer side walls and being aligned with a corresponding U-shaped slot such that a curvature of the U-shaped plate conforms to a curvature of the corresponding U-shaped slot. The seal assembly further comprises a plurality of seal moulds, each positioned in a respective region bounded by the peripheral portion and a lower surface of the covering structure, the pair of outer side walls, and an elevator cabin of the pneumatic vacuum elevator, the each seal mould having a first end abutting an outer side wall of a first U-shaped plate and a second end abutting an oppositely facing side wall of a second U-shaped plate positioned adjacent to the first U-shaped plate, the each seal mould further having a top bent portion extending toward a central region of the covering structure and partially abutting the lower surface of the covering structure, and a lower portion extending from the top bent portion to abut the elevator cabin, the top bent portion and the lower portion of the each seal mould forming respective sealing interfaces with the lower surface of the covering structure and with the elevator cabin, thereby enhancing sealing performance and reducing vibration transmission to the pneumatic vacuum elevator. The electronic control unit is located on top of the external cylinder assembly. The electronic control unit controls the movement of the elevator.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 6 is a flow chart representing the steps involved in a method for assembling a seal assembly of the elevator in accordance with an embodiment of the present disclosure.

Figure 1:
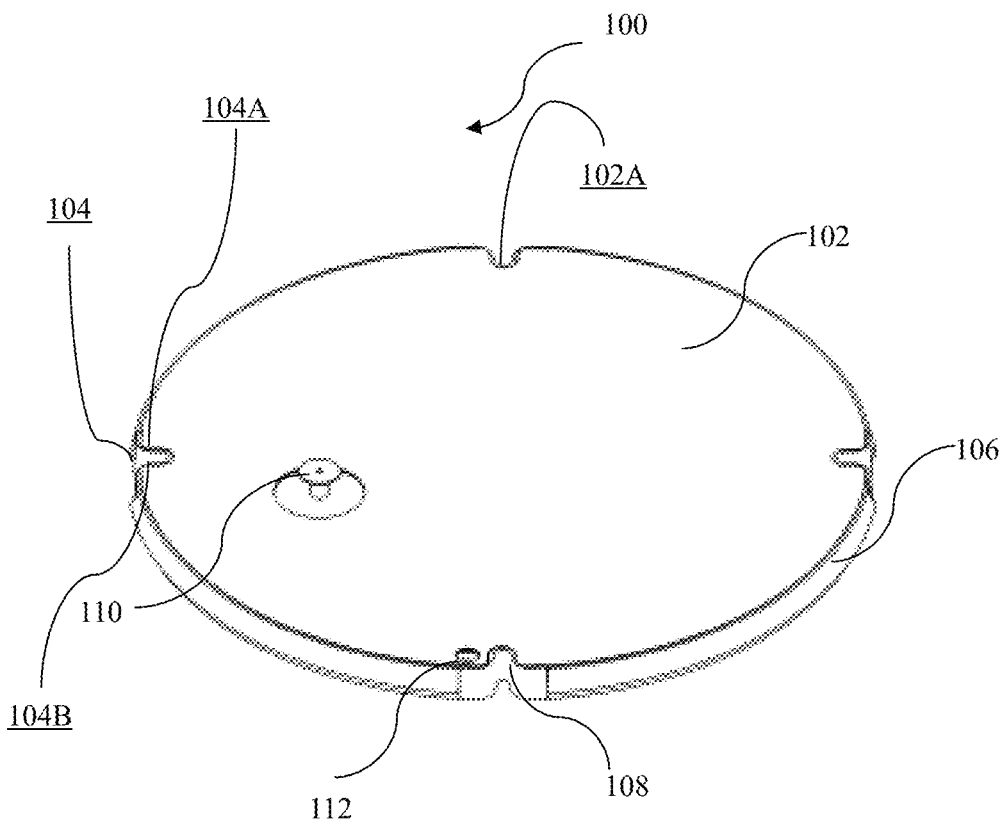
FIG. 1 is a schematic representation of a seal assembly in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a seal assembly for an elevator and a method to assemble the same. The seal assembly includes a covering structure. The covering structure is configured to cover a top portion of the elevator. The covering structure includes a plurality of pairs of grooves and a seal mould. The plurality of pairs of grooves is disposed on a peripheral portion of the covering structure. Each plurality of pairs of grooves is positioned diametrically opposite each other. The seal mould is operatively coupled with the plurality of pairs of grooves. The seal mould is adapted to position on the peripheral portion of the covering structure at a clearance between a wall of each groove of the plurality of pairs of grooves and a sealing material.

Figure 2:
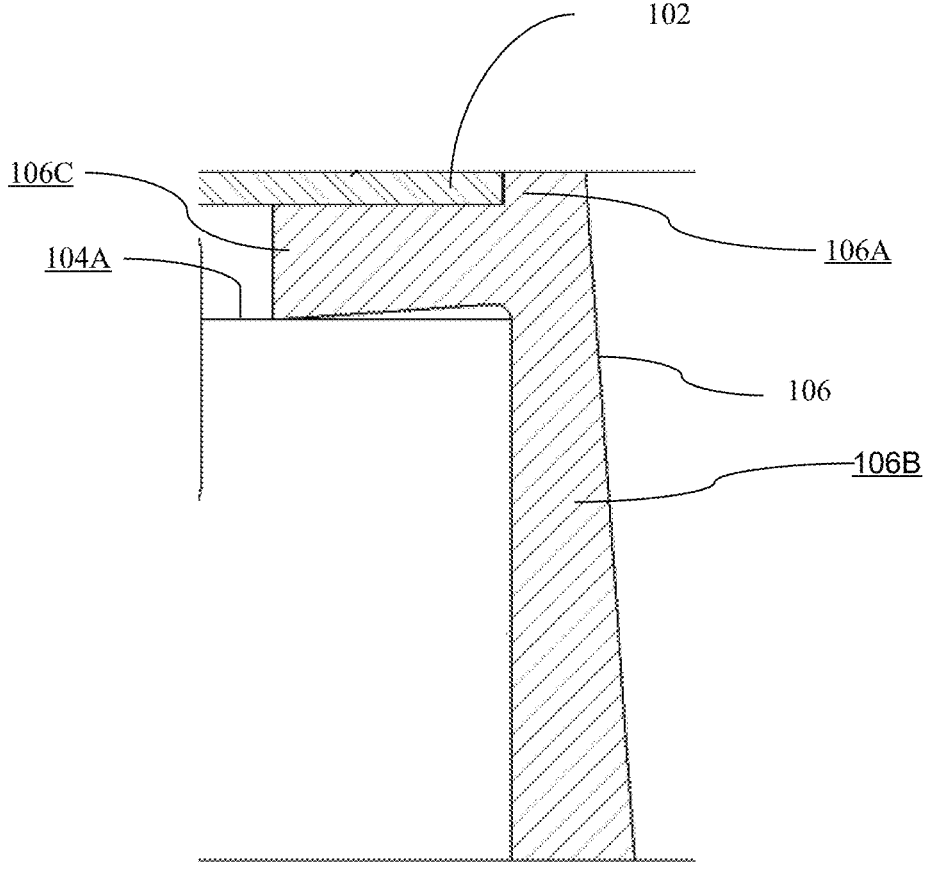
FIG. 2 is a schematic representation depicting structural relationship between the outer side walls of the U-shaped plates, the covering structure and the seal mould of the seal assembly of FIG. 1 in accordance with an embodiment of the present disclosure.
Figure 3:
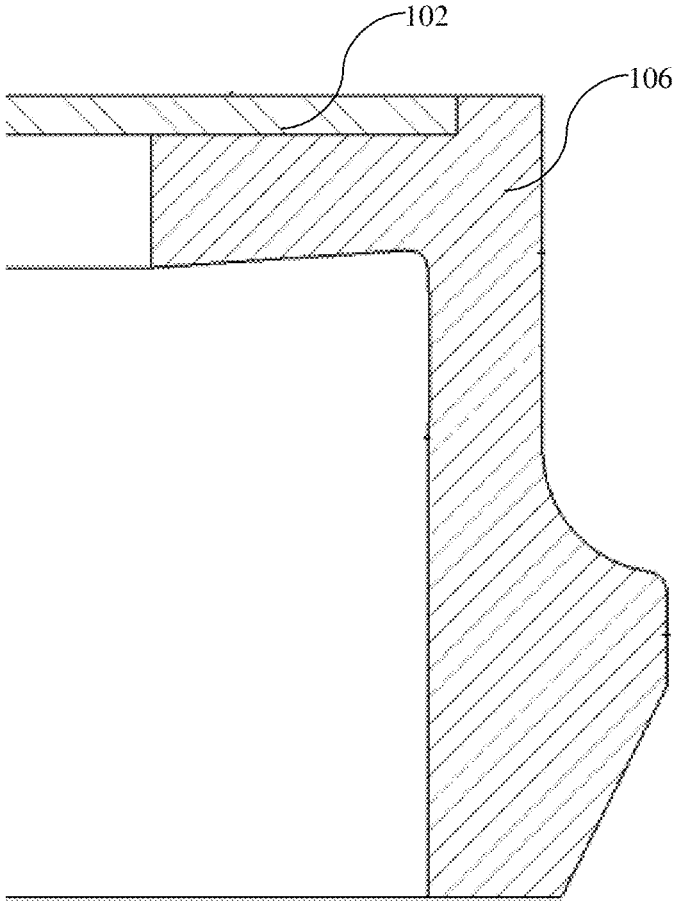
FIG. 3 is a schematic representation depicting structural relationship between the outer side walls of the U-shaped plates, the covering structure and the seal mould of the seal assembly of FIG. 1 as viewed in a region substantially away and between the U-shaped plate in accordance with an embodiment of the present disclosure.

FIG. 1 is a schematic representation of a seal assembly (100) in accordance with an embodiment of the present disclosure. FIG. 2 is a schematic representation depicting structural relationship between the outer side walls of the U-shaped plates, the covering structure and the seal mould of the seal assembly of FIG. 1 in accordance with an embodiment of the present disclosure. FIG. 3 is a schematic representation depicting structural relationship between the outer side walls of the U-shaped plates, the covering structure and the seal mould of the seal assembly of FIG. 1 as viewed in a region substantially away and between the U-shaped plate in accordance with an embodiment of the present disclosure. The seal assembly (100) includes a covering structure (102). The covering structure (100) is configured to cover a top portion of the elevator (200). In one embodiment, the covering structure (102) is configured to provide a covering to the elevator cabin (220) structural from sideways. The covering structure (102) having a plurality of pairs of U-shaped slots (102A) integrally formed along a peripheral portion of the covering structure (102), the plurality of pairs of U-shaped slots (102A) being arranged in mutually orthogonal orientations. A plurality of U-shaped plates (104) are disposed along the peripheral portion, each U-shaped plate (104) including a pair of outer side walls (104A, 104B) and being aligned with a corresponding U-shaped slot (102A) such that a curvature of the U-shaped plate (104) conforms to a curvature of the corresponding U-shaped slot (102A). In one embodiment, the covering structure (102) is circular in shape forming an arc between plurality of pairs of U-shaped slots (102A).

The seal assembly (100) further comprises a plurality of seal moulds (106) each positioned in a respective region bounded by the peripheral portion and a lower surface of the covering structure (102), the pair of outer side walls (104A, 104B), and an elevator cabin (220) of the pneumatic vacuum elevator (200), the each seal mould (106) having a first end abutting an outer side wall (104A) of a first U-shaped plate (104) and a second end abutting an oppositely facing side wall (104B) of a second U-shaped plate (104) positioned adjacent to the first U-shaped plate (104), the each seal mould (106) further having a top bent portion (106C) extending toward a central region of the covering structure (102) and partially abutting the lower surface of the covering structure (102), and a lower portion (106B) extending from the top bent portion (106C) to abut the elevator cabin (220), the top bent portion (106C) and the lower portion (106B) of the each seal mould (106) forming respective sealing interfaces with the lower surface of the covering structure (102) and with the elevator cabin (220), thereby enhancing sealing performance and reducing vibration transmission to the pneumatic vacuum elevator (200).

Further, each seal mould (106) includes an upper extension portion (106A) extending along a peripheral portion of the covering structure (102) in the respective region, the upper extension portion (106A) abuts the peripheral portion of the covering structure (102) to form an upper sealing interface.

In one embodiment, the seal assembly (100) includes a protruding portion (110) positioned at an offset from the central region of the covering structure (102). In one embodiment, the protruding portion (110) is protruded perpendicular to the covering structure (102). In another embodiment, the protruding portion (110) includes a circular crown positioned at the offset from the central region. In yet another embodiment, a slot (112) is positioned adjacent to a U-shaped plate of the plurality of U-shaped plates (104).

In an example, the each seal mould is made from a sealing material comprised of a rubber material for providing a tight sealing.

In one embodiment, each seal mould (106) provides sealing between the covering structure (102) and the elevator cabin (220). A top bent portion (106C) of the seal mould (106) partially abuts a lower surface of the covering structure (102), while a lower portion (106B) of the seal mould (106) abuts the elevator cabin (220), thereby forming respective upper and lower sealing interfaces. This multiple interface configuration ensures effective sealing of the elevator cabin (220) and simultaneously dampens vibrations transmitted to the cabin during upward and downward motion of the pneumatic vacuum elevator (200). In one specific embodiment, each seal mould (106) is formed of, or lined with, a soft rubberized sealing material to enhance airtightness and vibration absorption along the peripheral region.

In an exemplary embodiment, the covering structure (102) includes a plurality of plates (not shown in FIG. 1). The plurality of plates is mechanically coupled at a predetermined gap over the covering structure (102). The plurality of plates enables holding of the seal assembly (100) over the top surface of the elevator cabin (220) during upward and downward movement.

The elevator cabin is also characterised by a set of reinforcement bars. The set of reinforcement bars is mechanically coupled to bottom surface of the top plate in lateral plane and inner circumference of the seal cover outer plate. The set of reinforcement bars together form a predefined shape comprising a plurality of u-shaped inward depressions corresponding to the plurality of U-shaped plates thereby supporting the plurality of U-shaped plates. In an example, the covering structure (102) and the U-shaped plates may be made from steel.

Figure 4:
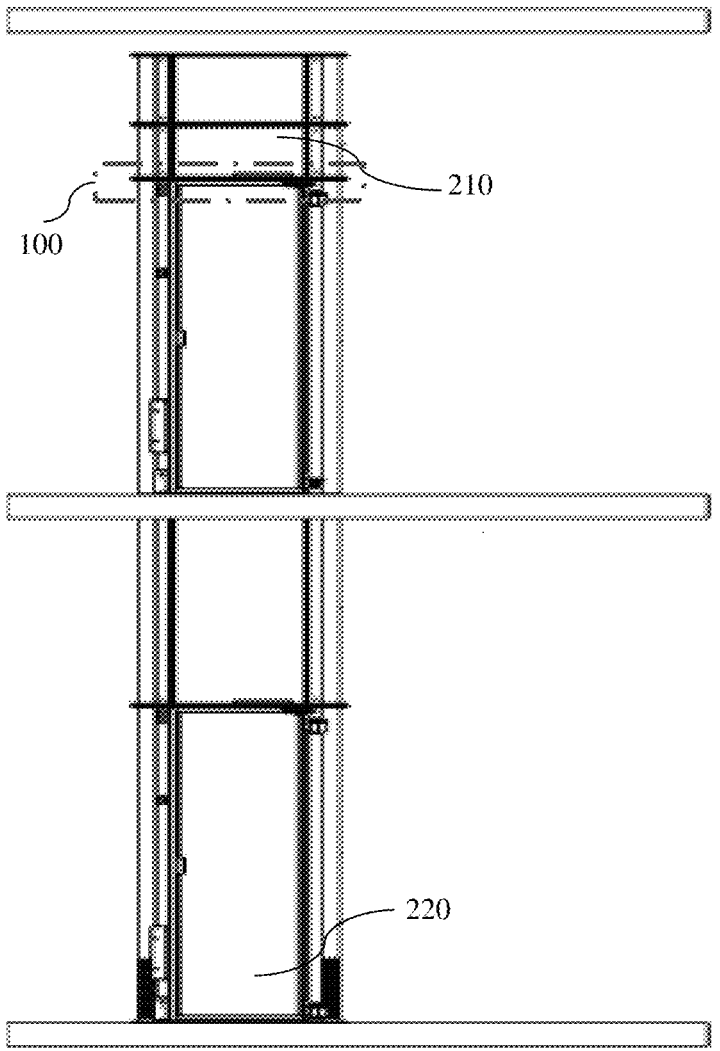
FIG. 4 is a schematic representation of a pneumatic vacuum elevator in accordance with an embodiment of the present disclosure.
Figure 5:
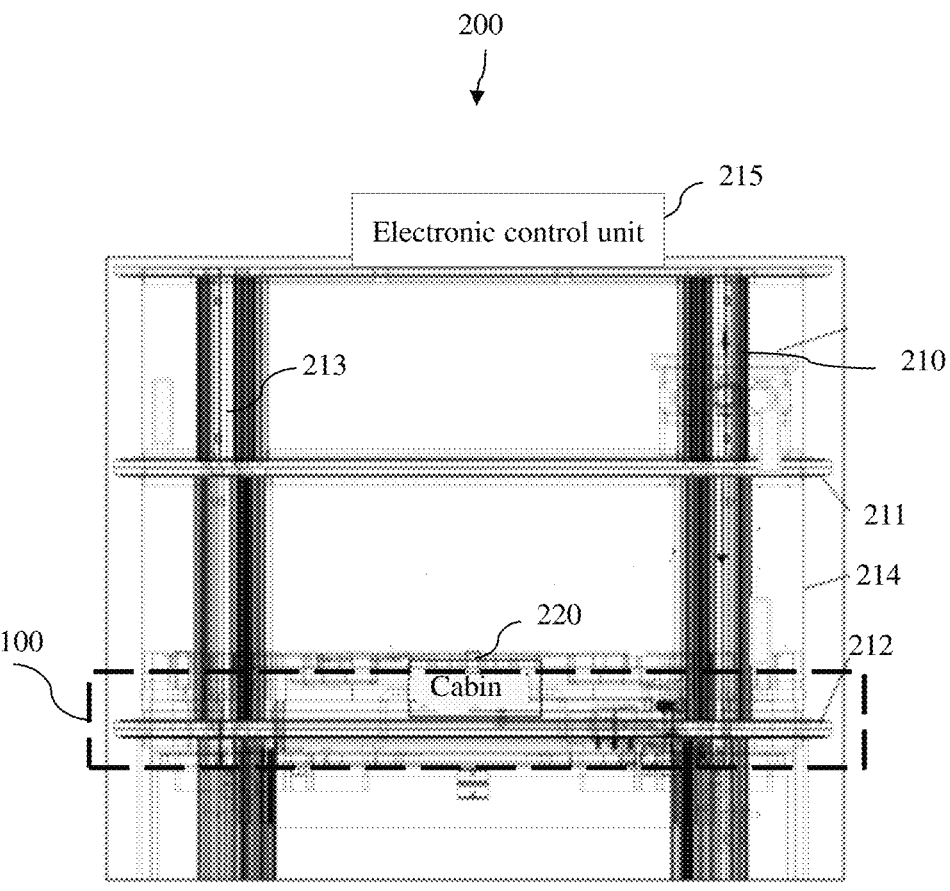
FIG. 5 is a schematic representation of a seal assembly corresponding to the pneumatic vacuum elevator in accordance with an embodiment of the present disclosure.

FIG. 4 is a schematic representation of a pneumatic vacuum elevator (200) in accordance with an embodiment of the present disclosure. FIG. 5 is a schematic representation of a seal assembly (100) corresponding to the pneumatic vacuum elevator (200) in accordance with an embodiment of the present disclosure. The elevator (200) includes an external cylinder assembly (210) including an elevator cabin (220) inserted therein. The elevator cabin (220) carries one or more users between one or more levels of a structure. In one embodiment, the structure may include a building, vessel or the like.

The external cylinder assembly (210) includes a plurality of cylinders coupled using a base ring assembly (211) and a band ring assembly (212). The base ring assembly (211) provides a supporting layer between other external cylinder assemblies which are connected above or below the top surface and the bottom surface of the external cylinder assembly (210) coupled with the base ring and as a result enables the extension of height pneumatic vacuum elevator based on the requirement. The base ring (211) act as a connecting device for coupling one or more components of the pneumatic vacuum elevator such as the vertical guide rail fitment and the external cylinder assembly for the formation of a compact integrated structure of the pneumatic vacuum elevator. Further, the external cylinder assembly has a band (outer) ring (212) that is used to intact both top and bottom side of the base ring. The band ring (212) is the maximum diameter part in the pneumatic vacuum elevator.

Furthermore, the pneumatic vacuum elevator (200) includes a guide rail pillar (213) mechanically coupled to the elevator cabin. The guide rail pillar is disposed at the external cylinder assembly. The guide rail pillar (213) is configured to guide an actuation of the elevator cabin. The guide rail pillar (213) guides support of the cabin movement in upper and lower side without causing friction and thus reduces anxiety of the passenger within the elevator. The guide rail pillar (213) connects the base ring and provides more strength and rigidity to shaft of the pneumatic vacuum elevator. In addition, the pneumatic vacuum elevator (200) includes a polycarbonate sheet (214) configured to cover the external cylinder assembly (210).

The polycarbonate sheet (214) and the external cylinder assembly is coupled using a first locking device and a second locking device. The first locking device is configured to lock an air gap between the polycarbonate sheet, the base ring assembly, and the external cylinder assembly. The first locking device (not shown in FIG. 5) acts as a tight lock or a hindrance between the base ring and the top and bottom surface of the vertical pillar so that the vertical pillar is constant at its respective position for providing vertical support for smooth functioning of the pneumatic vacuum elevator and moreover reduces the air gap so that any abnormality or distortion during the operation of the pneumatic vacuum elevator is avoided.

The second locking device (not shown in FIG. 5) is configured to lock the air gap between the polycarbonate sheet and the guide rail pillar. The second locking device helps in providing the locking mechanism to the guide rail by avoiding the formation of the air gap which not only keeps the guide rail in an intact position but also does not affect the smooth functioning of the guide rail in guiding the actuation of the cabin of the pneumatic vacuum elevator for transiting. Further, the pneumatic vacuum elevator (200) includes a seal assembly (215) adapted to fit over a top portion of the elevator cabin. The seal mould (106) comprises a covering structure (102) configured to cover a top portion of the pneumatic vacuum elevator (200), the covering structure (102) having a plurality of pairs of U-shaped slots (102A) integrally formed along a peripheral portion of the covering structure (102), the plurality of pairs of U-shaped slots (102A) being arranged in mutually orthogonal orientations, a plurality of U-shaped plates (104) disposed along the peripheral portion, each U-shaped plate (104) including a pair of outer side walls (104A, 104B) and being aligned with a corresponding U-shaped slot (102A) such that a curvature of the U-shaped plate (104) conforms to a curvature of the corresponding U-shaped slot (102A) and a plurality of seal moulds (106) each positioned in a respective region bounded by the peripheral portion and a lower surface of the covering structure (102), the pair of outer side walls (104A, 104B), and an elevator cabin (220) of the pneumatic vacuum elevator (200), the each seal mould (106) having a first end abutting an outer side wall (104A) of a first U-shaped plate (104) and a second end abutting an oppositely facing side wall (104B) of a second U-shaped plate (104) positioned adjacent to the first U-shaped plate (104), the each seal mould (106) further having a top bent portion (106C) extending toward a central region of the covering structure (102) and partially abutting the lower surface of the covering structure (102), and a lower portion (106B) extending from the top bent portion (106C) to abut the elevator cabin (220), the top bent portion (106C) and the lower portion (106B) of the each seal mould (106) forming respective sealing interfaces with the lower surface of the covering structure (102) and with the elevator cabin (220), thereby enhancing sealing performance and reducing vibration transmission to the pneumatic vacuum elevator (200).

The elevator (200) also includes an electronic control unit (215) located on an external cylinder assembly (210) of the pneumatic vacuum elevator (200). In one embodiment, the electronic control unit (215) controls the movement of the elevator (200).

FIG. 6 is a flow chart representing the steps involved in a method (300) for assembling a seal assembly for a pneumatic vacuum elevator is provided.

The method (300) includes providing (302) a covering structure configured to cover a top portion of the pneumatic vacuum elevator.

The method (300) includes forming (304) a plurality of pairs of U-shaped slots integrally along a peripheral portion of the covering structure, the plurality of pairs of U-shaped slots being arranged in mutually orthogonal orientations.

The method (300) includes disposing (306) a plurality of U-shaped plates along the peripheral portion of the covering structure, each U-shaped plate including a pair of outer side walls and being aligned with a corresponding U-shaped slot such that a curvature of the U-shaped plate conforms to a curvature of the corresponding U-shaped slot. Furthermore, the method (300) includes positioning (308) a plurality of seal moulds, each in a respective region bounded by the peripheral portion and a lower surface of the covering structure, the pair of outer side walls, and an elevator cabin of the pneumatic vacuum elevator, arranging (310) each seal mould such that a first end of the seal mould abuts an outer side wall of a first U-shaped plate and a second end of the seal mould abuts an oppositely facing side wall of a second U-shaped plate positioned adjacent to the first U-shaped plate, orienting (312) each seal mould such that a top bent portion of the seal mould extends toward a central region of the covering structure and partially abuts the lower surface of the covering structure and disposing a lower portion of each seal mould to abut the elevator cabin, whereby the top bent portion and the lower portion of each seal mould form respective sealing interfaces with the lower surface of the covering structure and with the elevator cabin, thereby enhancing sealing performance and reducing vibration transmission to the pneumatic vacuum elevator.

Various embodiments of the system and method to operate the seal assembly for the elevator described above enable a simple assembly which may provide a tight sealing by using a circumferential rubber mold arranged. The seal assembly disclosed in the present disclosure is incorporated into the controls of the elevator systems to provide a smooth riding of the elevator cabin. The seal assembly in the recent disclosure provides easy mounting of sealing material on the elevator cabin.

The present disclosure of seal assembly corresponding to an elevator effectively solves the issue of vibration and sealing.

The system has intelligence, efficient, and energy-saving advantages which result in significant economic benefit and social benefits. The control unit stabilizes the pneumatic elevator and controls on the architectural basis. The control unit also provides high stability and strong anti-interference ability.

Furthermore, there is no intention to be bound by any expressed or implied theory presented in the preceding technical field, background, brief summary, or detailed description. It is also to be understood that the specific devices and processes illustrated in the attached drawings, and described in the specification, are simply exemplary embodiments of the inventive concepts defined in the appended claims. Hence, specific dimensions and other physical characteristics relating to the embodiments disclosed herein are not to be considered as limiting, unless the claims expressly state otherwise.

While specific language has been used to describe the disclosure, any limitations arising on account of the same are not intended. As would be apparent to a person skilled in the art, various working modifications may be made to the method (250) in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A seal assembly (100) for a pneumatic vacuum elevator (200), comprising:

a covering structure (102) configured to cover a top portion of the pneumatic vacuum elevator (200), the covering structure (102) having a plurality of pairs of U-shaped slots (102A) integrally formed along a peripheral portion of the covering structure (102), the plurality of pairs of U-shaped slots (102A) being arranged in mutually orthogonal orientations;

a plurality of U-shaped plates (104) disposed along the peripheral portion, each U-shaped plate (104) including a pair of outer side walls (104A, 104B) and being aligned with a corresponding U-shaped slot (102A) such that a curvature of the U-shaped plate (104) conforms to a curvature of the corresponding U-shaped slot (102A); and a plurality of seal moulds (106) each positioned in a respective region bounded by the peripheral portion and a lower surface of the covering structure (102), the pair of outer side walls (104A, 104B), and an elevator cabin (220) of the pneumatic vacuum elevator (200), the each seal mould (106) having a first end abutting an outer side wall (104A) of a first U-shaped plate (104) and a second end abutting an oppositely facing side wall (104B) of a second U-shaped plate (104) positioned adjacent to the first U-shaped plate (104), the each seal mould (106) further having a top bent portion (106C) extending toward a central region of the covering structure (102) and partially abutting the lower surface of the covering structure (102), and a lower portion (106B) extending from the top bent portion (106C) to abut the elevator cabin (220), the top bent portion (106C) and the lower portion (106B) of the each seal mould (106) forming respective sealing interfaces with the lower surface of the covering structure (102) and with the elevator cabin (220), thereby enhancing sealing performance and reducing vibration transmission to the pneumatic vacuum elevator (200).

2. The seal assembly as claimed in claim 1, wherein the covering structure (102) is circular in shape forming an arc between the plurality of pairs of U-shaped slots (102A).

3. The seal assembly as claimed in claim 1, comprises a protruding portion (110) positioned at an offset from the central region of the covering structure (102).

4. The seal assembly as claimed in claim 3, wherein the protruding portion (110) is protruded perpendicular to the covering structure (102), wherein the protruding portion (110) comprises a circular crown positioned at the offset from the central region.

5. The seal assembly as claimed in claim 1, wherein the seal mould (106) is made from a sealing material is comprised of a rubber material for providing a tight sealing.

6. The seal assembly as claimed in claim 1, comprises a slot (112) positioned adjacent to a U-shaped plate of the plurality of U-shaped plates (104).

7. A pneumatic vacuum elevator (200) comprising:

an external cylinder assembly (210) comprising an elevator cabin (220) inserted therein, wherein the external cylinder assembly (210) comprises a plurality of cylinders coupled using a base ring assembly (211) and a band ring assembly (212);

a guide rail pillar (213) mechanically coupled to the elevator cabin (220), wherein the guide rail pillar (213) is disposed at the external cylinder assembly (210), wherein the guide rail pillar (213) is configured to guide an actuation of the elevator cabin (220);

a polycarbonate sheet (214) configured to cover the external cylinder assembly (210), wherein the polycarbonate sheet (214) and the external cylinder assembly (210) is coupled using a first locking device and a second locking device, wherein the first locking device is configured to lock an air gap between the polycarbonate sheet (214), the base ring assembly (211) and the external cylinder assembly (210) and the second locking device is configured to lock air gap between the polycarbonate sheet (214) and the guide rail pillar (213); and an electronic control unit (215) located on top of the external cylinder assembly (210), wherein the electronic control unit (215) controls the movement of the elevator; and wherein the seal assembly as claimed in claim 1 is positioned therein.

8. The seal assembly as claimed in claim 1, wherein each seal mould (106) includes an upper extension portion (106A) extending along a peripheral portion of the covering structure (102) in the respective region, the upper extension portion (106A) abutting the peripheral portion of the covering structure (102) to form an upper sealing interface.

\* \* \* \* \*